United States Patent
Chen et al.

(10) Patent No.: US 9,164,639 B2
(45) Date of Patent: Oct. 20, 2015

(54) TOUCH PANEL

(71) Applicant: WINTEK CORPORATION, Taichung (TW)

(72) Inventors: Chia-Chi Chen, Taichung (TW);
Ming-Kung Wu, Taichung (TW);
Yu-Chen Fang, Taichung (TW);
Chia-Ching Lu, Taichung (TW)

(73) Assignee: WINTEK CORPORATION, Taichung (TW)

( * ) Notice: Subject to any disclaimer, the term of this patent is extended or adjusted under 35 U.S.C. 154(b) by 93 days.

(21) Appl. No.: 14/159,451

(22) Filed: Jan. 21, 2014

(65) Prior Publication Data

US 2014/0204290 A1 Jul. 24, 2014

(30) Foreign Application Priority Data

Jan. 24, 2013 (TW) .............................. 102102630 A

(51) Int. Cl.
*G06F 3/044* (2006.01)

(52) U.S. Cl.
CPC ...... *G06F 3/044* (2013.01); *G06F 2203/04111* (2013.01); *G06F 2203/04112* (2013.01)

(58) Field of Classification Search
CPC .......... G06F 3/044; G06F 2203/04111; G06F 3/041; G06F 1/1643; G06F 2203/04107; G06F 2203/04112
See application file for complete search history.

(56) References Cited

U.S. PATENT DOCUMENTS

| 2011/0316803 A1* | 12/2011 | Kim .............................. 345/173 |
| 2012/0086655 A1* | 4/2012 | Wang et al. ................... 345/173 |
| 2012/0169647 A1* | 7/2012 | Kuo .............................. 345/174 |

* cited by examiner

*Primary Examiner* — Gerald Johnson
(74) *Attorney, Agent, or Firm* — Ming Chow; Sinorica, LLC

(57) ABSTRACT

A touch panel includes a first substrate, a low light-shielding decoration layer, and a transparent conductive pattern. The first substrate has a peripheral region. The low light-shielding decoration layer is disposed within the peripheral region of the first substrate. The transparent conductive pattern includes transparent touch electrodes and transparent conductive lines. The transparent touch electrodes are at least disposed on the first substrate. The transparent conductive lines are disposed on the low light-shielding decoration layer within the peripheral region. Each of the transparent conductive lines is connected with at least one of the transparent touch electrodes.

17 Claims, 7 Drawing Sheets

TOUCH PANEL

BACKGROUND OF THE INVENTION

1. Field of the Invention

The present invention generally relates to a touch panel, and more particularly, to a touch panel having transparent touch electrodes and transparent conductive lines respectively disposed within a viewing region and a peripheral region by using a single transparent conductive pattern.

2. Description of the Prior Art

In recent years, mobile phones, GPS navigator system, personal digital, tablet PCs, assistants (PDA) and notebook PCs with touch functions have been wildly used in modern life. In the above-mentioned electronic products, the touch display devices can be obtained by integrating the original display function with the touch sensing function. Nowadays, an out-cell touch display panel, which includes a display panel and a touch panel adhered to each other, is one of the mainstream development in the field of the touch display devices. Generally, the touch panels can be mainly divided into two types according to their configurations, i.e. the glass/glass touch panels and the one glass solution (OGS) touch panels. In the OGS touch panel, since a touch sensing unit is formed on the cover glass directly, the total amount of glass substrate is reduced to provide a thinner and simplified structure.

In a traditional OGS touch panel, metal conductive lines are usually disposed in a peripheral region and may be used to electrically connect transparent touch electrodes within a viewing region. A black matrix is also disposed within the peripheral region as a light shielding material so that the metal conductive lines within the peripheral region can be shielded and the appearance of the touch panel can be improved. In addition, since the metal conductive lines and the transparent touch electrodes usually have different compositions and conductivity, the reliability of the touch panel is often negatively affected due to some electrical damages, such as electrostatic discharge, occurring in junctions between the metal conductive lines and the corresponding transparent touch electrodes. In another case, in order to show different color appearance in the peripheral region of the touch panel, a low light-shielding decoration layer is usually disposed within the peripheral region. However, since the low light-shielding decoration layer has low optical density and high light transmittance, the metal conductive lines within the peripheral region covered by the low light-shielding decoration layer can be usually seen by users, and the appearance of the touch panel will be severely affected consequently.

SUMMARY OF THE INVENTION

One objective of the present invention is to provide a touch panel. A single transparent conductive pattern is used to form transparent touch electrodes and transparent conductive lines respectively within a viewing region and a peripheral region, and a low light-shielding decoration layer is disposed within the peripheral region. As a result, the reliability and the appearance of the touch panel can all be improved in this specific configuration.

Accordingly, a touch panel is provided according to one preferred embodiment of the present invention. The touch panel includes a first substrate, a low light-shielding decoration layer, and a transparent conductive pattern. The first substrate has a peripheral region. The low light-shielding decoration layer is disposed within the peripheral region of the first substrate. The transparent conductive pattern includes transparent touch electrodes and transparent conductive lines. The transparent touch electrodes are at least disposed on the first substrate and the transparent conductive lines are disposed on the low light-shielding decoration layer within the peripheral region. Each of the transparent conductive lines is connected with at least one of the transparent touch electrodes.

Also, another touch panel is disclosed according to another preferred embodiment of the present invention. The touch panel includes at least a first substrate, a second substrate, a low light-shielding decoration layer, and a transparent conductive pattern. Specifically, the second substrate is opposite to the first substrate. The low light-shielding decoration layer is disposed within the peripheral region of the first substrate. Besides, the transparent conductive pattern includes transparent touch electrodes and transparent conductive lines. Specifically, the transparent touch electrodes are disposed on the second substrate and the transparent conductive lines are disposed on the second substrate corresponding to the peripheral region. Each of the transparent conductive lines is connected with at least one of the transparent touch electrodes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
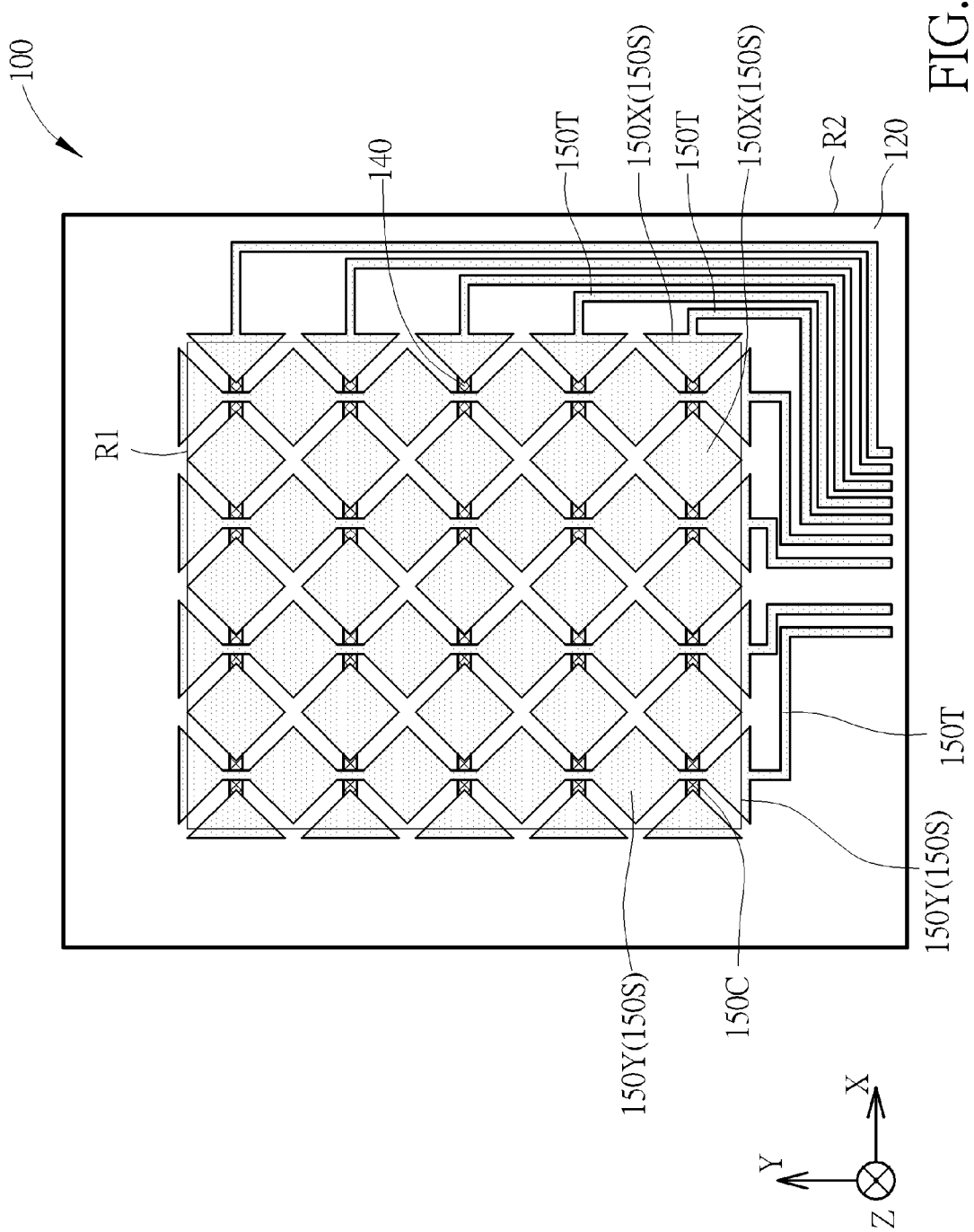
FIG. 1 is a schematic diagram showing a touch panel according to a first preferred embodiment of the present invention.
Figure 2:
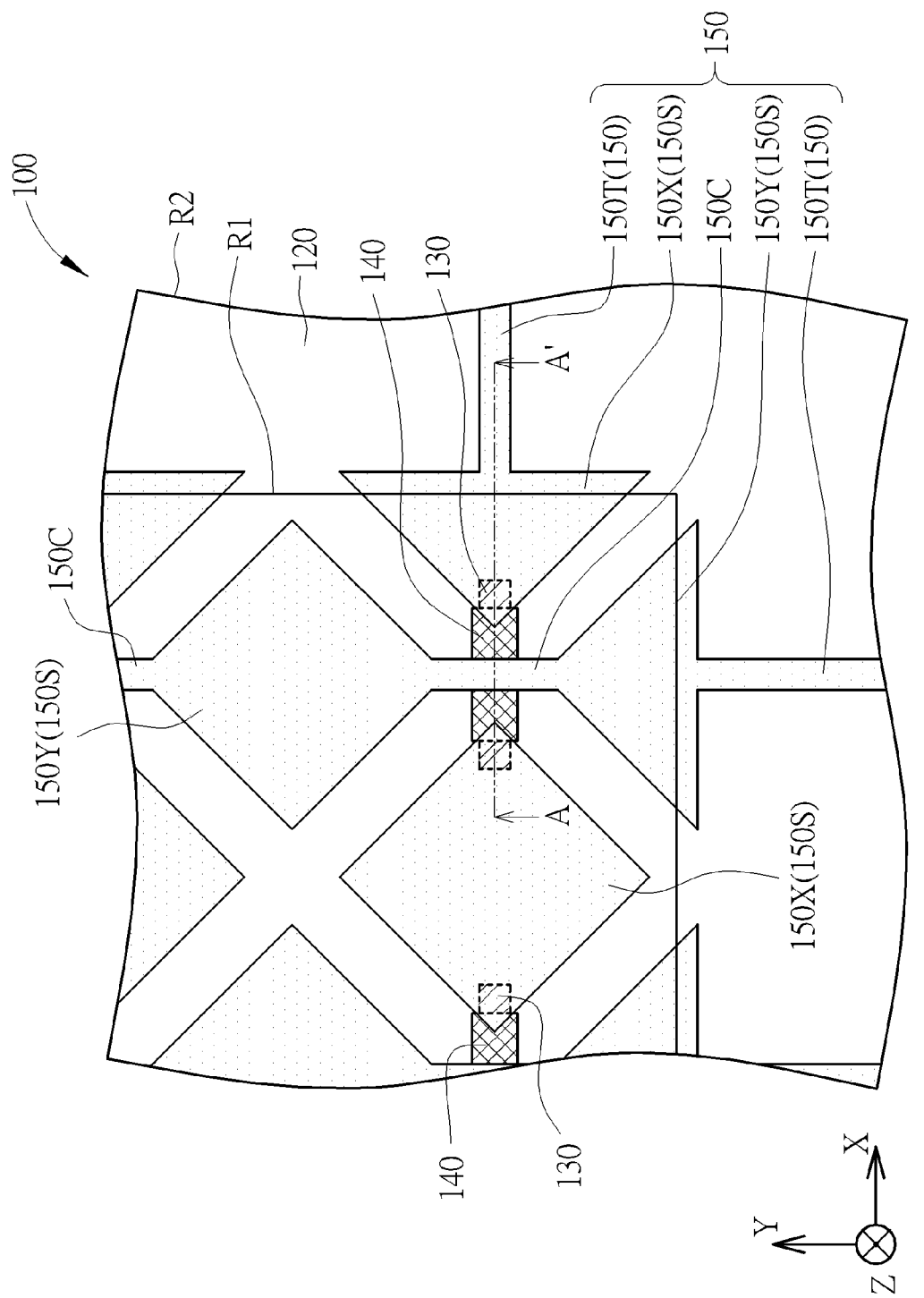
FIG. 2 is a partially enlarged schematic diagram of the touch panel shown in FIG. 1.
Figure 3:
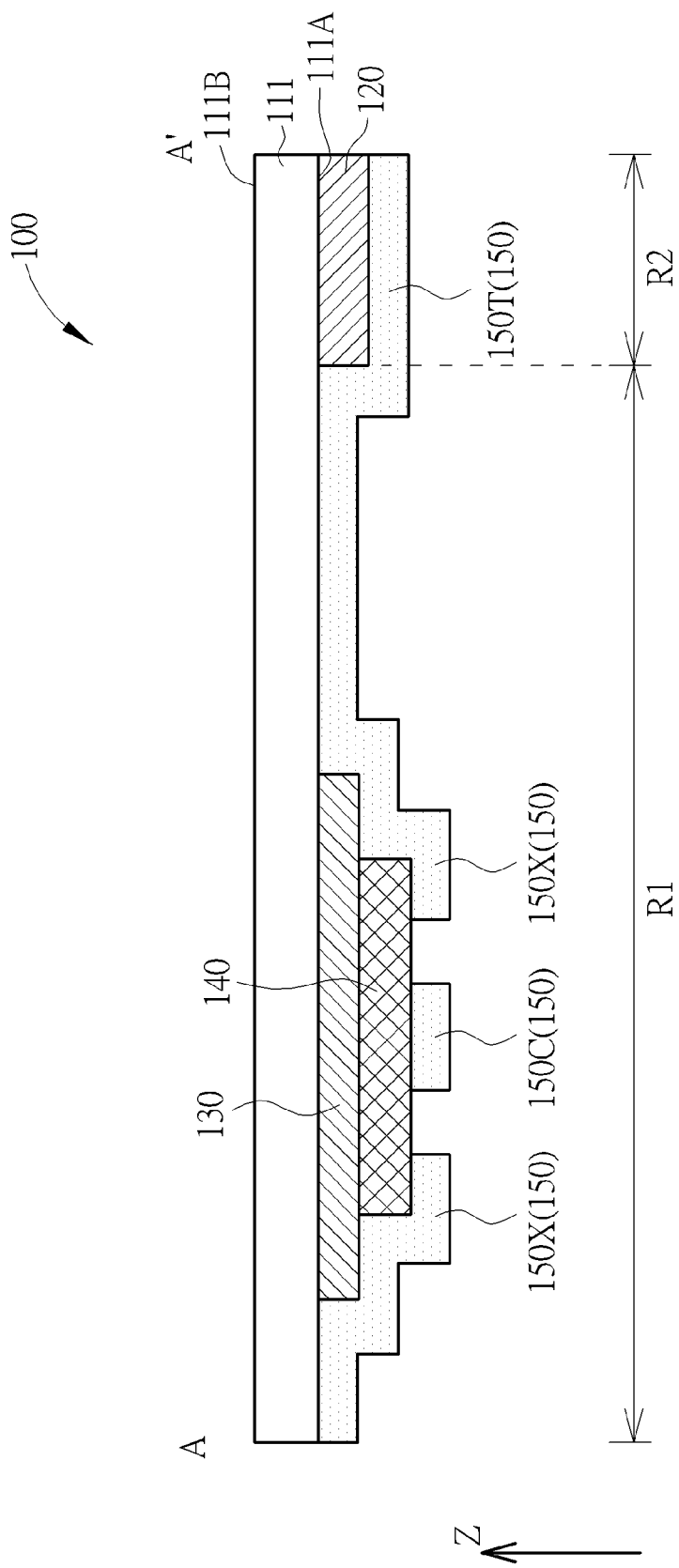
FIG. 3 is a schematic cross-sectional diagram taken along a line A-A' in FIG. 2.
Figure 4C:
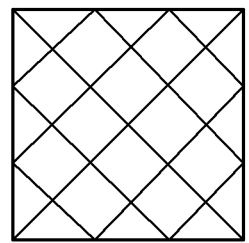
FIG. 4A, FIG. 4B and FIG. 4C are schematic diagrams respectively showing a transparent conductive pattern of a touch panel according to the present invention.
Figure 4B:
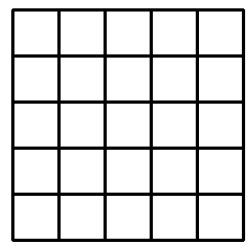
Figure 4A:
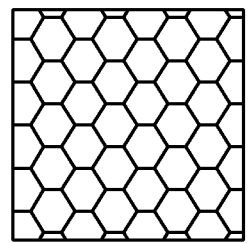

Please refer to FIG. 1, FIG. 2, FIG. 3, FIG. 4A, FIG. 4B and FIG. 4C. FIG. 1 is a schematic diagram showing a touch panel according to a first preferred embodiment of the present invention. FIG. 2 is a partially enlarged schematic diagram of a touch panel shown in FIG. 1. FIG. 3 is a schematic cross-sectional diagram taken along a line A-A' in FIG. 2. FIG. 4A, FIG. 4B and FIG. 4C are schematic diagrams showing a transparent conductive pattern of a touch panel according to the present invention. It should be noted that all the figures are diagrammatic. Relative dimensions and proportions of parts of the drawings have been shown exaggerated or reduced in size, for the sake of clarity and convenience in the drawings. The actual dimensions and proportions of parts of the drawings may be modified in accordance with the specific requirements. Referring to FIGS. 1-3, the present embodiment provides a touch panel 100. The touch panel 100 includes a first substrate 111, a transparent conductive pattern 150 and a low light-shielding decoration layer 120. The first substrate 111 has a viewing region R1 and a peripheral region R2 wherein the viewing region R1 shows the image of the display through the light transmitting first substrate 111. The peripheral region R2 is located on at least one side of the viewing region R1. According to the present embodiment, the peripheral region R2 surrounds the viewing region R1, but not limited thereto. Alternatively, the peripheral region R2 may be only contiguous to a portion of the edge of the viewing region R1. The first substrate 111 may include a rigid substrate, such as a glass substrate, a cover lens, and a cover glass, a flexible substrate/film substrate, such as a plastic substrate or other substrate composed of suitable materials. According to the present embodiment, the first substrate 111 is preferably a cover lens, but not limited thereto. A transparent conductive pattern 150 is disposed on the first substrate 111 and includes a plurality of transparent touch electrodes 150S and a plurality of transparent conductive lines 150T. The transparent touch electrodes 150S are mainly disposed in the viewing region R1 and partially extends to the peripheral region R2, while the transparent conductive lines 150T are disposed in the peripheral region R2. Each of the transparent conductive lines 150T is connected to and formed integrally with at least one of the corresponding transparent touch electrodes 150S. In other words, the transparent conductive pattern 150 is preferably formed through patterning a transparent conductive material layer. In this way, the transparent conductive lines 150T and the transparent touch electrodes 150S may be formed through this patterning process. Therefore, the transparent conductive lines 150T can be connected to the corresponding transparent touch electrodes 150S concurrently when they are formed. Alternatively, the transparent conductive pattern 150 may be a metal mesh pattern fabricated through patterning a metal layer. For example, as shown in FIG. 4A, FIG. 4B and FIG. 4C, the metal mesh pattern may be a pattern composed of repeat and continuous geometrical shapes with the same size or different sizes and shapes, such as a diamond-shaped pattern, a square- or a rectangle-shaped pattern, and a hexagon-shaped pattern, respectively shown in FIG. 4A, FIG. 4B and FIG. 4C. The shape of the metal mesh pattern is not limited to that shown in FIG. 4A, FIG. 4B and FIG. 4C. That is to say, the metal mesh pattern may have other regular or irregular shapes. It should be noted that, according to various product requirements, the transparent conductive pattern disclosed in each of the following embodiments may be a metal mesh pattern fabricated through patterning a metal layer.

According to the present embodiment, the transparent touch electrodes 150S mainly disposed in the viewing region R to perform touch sensing function and the transparent conductive lines 150T disposed in the peripheral region R2 are formed integrally and physically connected to one another. Since the transparent touch electrodes 150S and the transparent conductive lined 150T are composed of the same transparent conductive material, interfaces existing between different materials are absent from the junctions between the transparent touch electrodes 150S and the transparent conductive lines 150T. Therefore, some electrical damages, such as electrostatic discharge damage and the like, may be overcome and the reliability of the touch panel 100 may be improved. The composition of the transparent conductive material layer may include indium tin oxide (ITO), indium zinc oxide (IZO), aluminum zinc oxide (AZO), nano-silver wire or other suitable transparent conductive materials. Additionally, the low light-shielding decoration layer 120 disclosed in the present embodiment is disposed between the first substrate 111 and the transparent conductive lines 150T in the peripheral region R2. An optical density (OD) of the low light-shielding decoration layer 120 is preferably lower than or equal to 3. The low light-shielding decoration layer 120 preferably includes color photoresist or ink. In addition, the low light-shielding decoration layer 120 can be single layer or multiple layers stacked with each other. Specifically, the first substrate 111 has an inner surface 111A and an outer surface 111B. The low light-shielding decoration layer 120 and the transparent conductive pattern 150 are disposed on the inner surface 111A, while the outer surface 111B may be regarded as a touch surface, but not limited thereto. In order to obtain required color appearance, the composition of the low light-shielding decoration layer 120 in the peripheral region R2 may be modified to fulfill such needs. In this case, light-shielding effects provided by the low light-shielding decoration layer 120 is insufficient for the requirements due to its low optical density (lower than or equal to 3). However, since the transparent conductive lines 150T in the peripheral region R2 used to electrically connect the transparent touch electrodes 150S and the external devices (not shown) are also transparent, the transparent conductive lines 150T in the peripheral region R2 under the low light-shielding decoration layer 120 may still not be seen by the viewer. In this way, the appearance quality of the touch panel 100 may remain the same even though the low light-shielding decoration layer 120 is disposed in the peripheral region R2.

Specifically, the low light-shielding decoration layer 120 disclosed in the present embodiment may preferably directly contact the inner surface 111A of the first substrate 111, and the transparent conductive lines 150T preferably directly contact the low light-shielding decoration layer 120, but not limited thereto. Each of the transparent touch electrodes 150S according to the present embodiment includes a plurality of first axis electrodes 150X, a plurality of second axis electrodes 150Y, and a plurality of transparent connecting lines 150C. In other words, the first axis electrodes 150X, the second axis electrodes 150Y, the transparent connecting lines 150C, and the transparent conductive lines 150T are formed through patterning the same transparent conductive material layer. The first axis electrodes 150X are aligned along a first direction X, and each of the first axis electrodes 150X is physically separated from one another. The second axis electrodes 150Y and the transparent connecting lines 150C between the two adjacent second axis electrodes 150Y are aligned along a second direction Y, and formed integrally. The first direction X is preferably substantially perpendicular to the second direction Y, but not limited thereto. Besides, the touch panel 100 may further include a plurality of bridge electrodes 130 and a plurality of isolation blocks 140. The bridge electrodes 130 are disposed in the viewing region R1. Each bridge electrode 130 connects two adjacent first axis electrodes 150X so as to electrically connect two adjacent first axis electrodes 150X. The composition of the bridge electrodes 130 may include transparent conductive materials, such as indium tin oxide, indium zinc oxide, aluminum zinc oxide, indium gallium oxide and nano-silver wire or other suitable non-transparent conductive materials, such as silver, aluminum, copper, magnesium, molybdenum, a composite layer thereof, an alloy or a composite thereof, but not limited thereto. The isolation blocks 140 are disposed in the viewing region R1, and each isolation block 140 is disposed between the corresponding bridge electrode 130 and transparent connecting line 150C so as to electrically isolate the corresponding bridge electrode 130 and transparent connecting line 150C. Since the two adjacent second axis electrodes 150Y along the second direction Y are mutually physically connected and formed integrally, so that each isolation block 140 may be regarded as being disposed between the corresponding bridge electrode 130 and second axis electrode 150Y. The composition of the isolation blocks 140 may include oxide, such as titanium oxide ($TiO_2$) and silicon oxide (SiOx), nitride, such as silicon nitride (SiNx), or other suitable organic isolation materials. In other words, the bridge electrodes 130, the isolation blocks 140 and the transparent conductive pattern 150 may be sequentially formed on the inner surface 111A of the first substrate 111, but not limited thereto. Each isolation block 140 preferably partially covers the corresponding bridge electrode 130 along a third direction Z perpendicular to the first substrate 111. In this configuration, regions of the bridge electrodes 130 uncovered by the isolation blocks 140 may contact the subsequently formed first axis electrodes 150X so as to be electrically connected to the first axis electrodes 150X.

It is worth noting that the touch panel disclosed in the present invention preferably may be integrated with a display panel (not shown), such as a liquid display panel, an organic light emitting diode (OLED) display panel, an electro-wetting display panel, an e-ink display panel, a plasma display panel or a field emission display (FED) panel, to thereby form a touch display device, but not limited thereto.

In the following paragraph, various embodiments are disclosed and the description of these embodiments is mainly focused on differences among one another. In addition, like or similar features will usually be described with same reference numerals for ease of illustration and description thereof.

Figure 5:
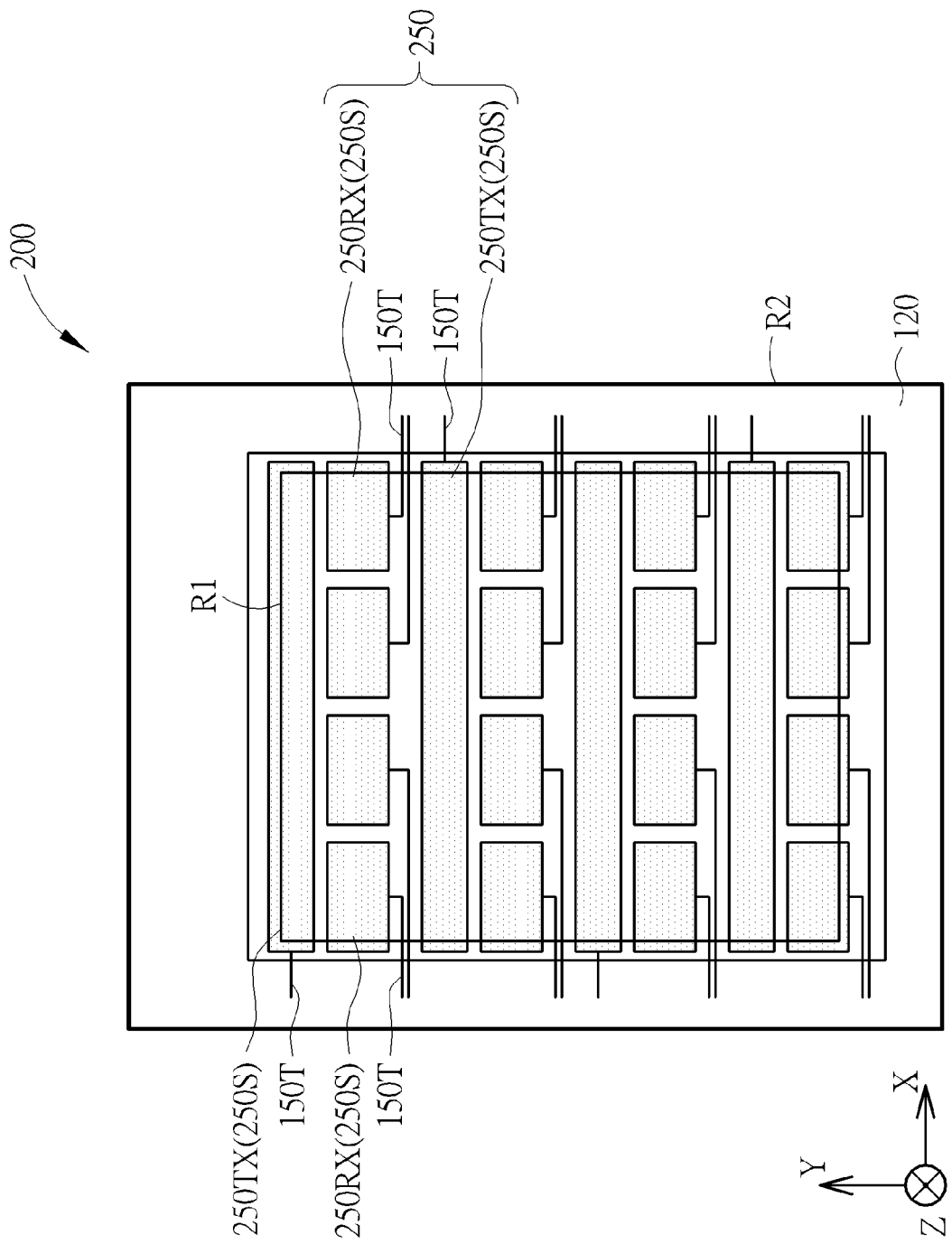
FIG. 5 is a schematic diagram showing a touch panel according to a second preferred embodiment of the present invention.

Please refer to FIG. 5. FIG. 5 is a schematic diagram showing a touch panel according to a second preferred embodiment of the present invention. As shown in FIG. 5, the present embodiment provides a touch panel 200. One difference from the first preferred embodiment is that the touch panel 200 includes a transparent conductive pattern 250. The transparent conductive pattern 250 includes a plurality of transparent touch electrodes 250S and a plurality of transparent conductive lines 150T. Each transparent sensitive electrode 250S is disposed in the viewing region R1 and arranged apart from one another. Each transparent conductive line 150T is connected to and formed integrally with at least one of the corresponding transparent touch electrodes 250S. Additionally, the transparent touch electrodes 250S may further include a plurality of signal transmitting electrodes 250TX and a plurality of signal receiving electrodes 250RX, used to respectively transmit and receive the touch sensing signals. In other words, the touch panel 200 may be a mutual capacitive touch panel, but not limited thereto. Apart from the structure of the signal transmitting electrodes 250TX and the signal receiving electrodes 250RX, the rest of the parts of the touch panel 200 disclosed in this embodiment, such as the positions of other parts and the material properties are almost similar to those described in the previous first preferred embodiment. For the sake of brevity, these similar configurations and properties are therefore not disclosed in detail.

Figure 6:
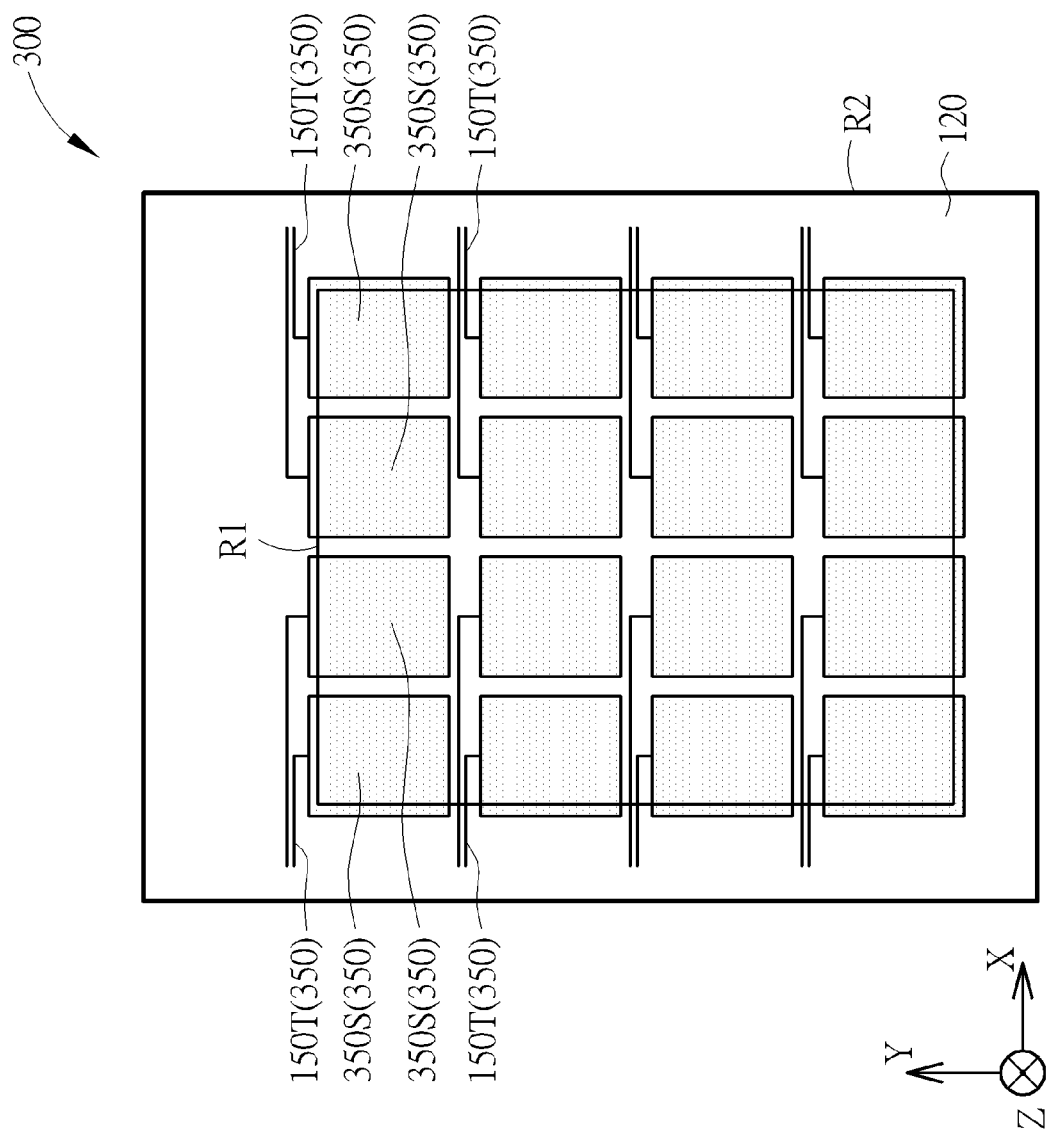
FIG. 6 is a schematic diagram showing a touch panel according to a third preferred embodiment of the present invention.

Please refer to FIG. 6. FIG. 6 is a schematic diagram showing a touch panel according to a third preferred embodiment of the present invention. As shown in FIG. 6, the present embodiment provides a touch panel 300. One difference from the first preferred embodiment is that the touch panel 300 includes a transparent conductive pattern 350. The transparent conductive pattern 350 includes a plurality of transparent touch electrodes 350S and a plurality of transparent conductive lines 150T. The transparent touch electrodes 350S are disposed in the viewing region R1 and arranged apart from one another. Each transparent conductive line 150T is connected to and formed integrally with at least one of the corresponding transparent sensitive electrode 350S. In addition, the transparent touch electrodes 350S are preferably separately disposed in the viewing region R1 so as to perform touch sensing function. Each transparent sensitive electrode 350S according to the present embodiment is preferably a rectangle-shaped electrode, but not limited thereto. Each transparent sensitive electrode may has other shape, such as triangle-shape, if required, and may be distributed in the viewing region R1 so as to reach required touch sensing function.

Figure 7:
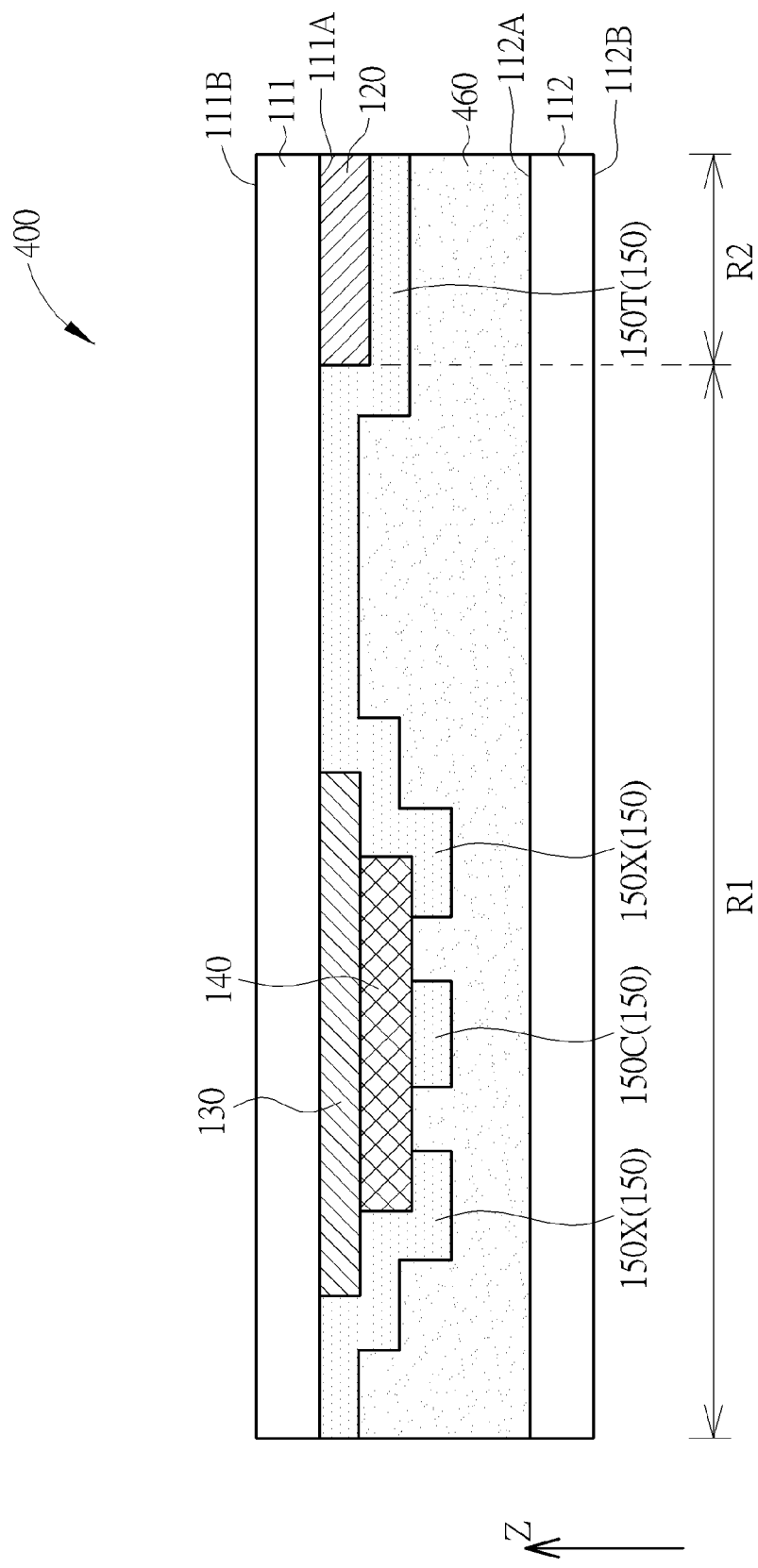
FIG. 7 is a schematic diagram showing a touch panel according to a fourth preferred embodiment of the present invention.

Please refer to FIG. 7. FIG. 7 is a schematic diagram showing a touch panel according to a fourth preferred embodiment of the present invention. As shown in FIG. 7, the present embodiment provides a touch panel 400. One difference from the first preferred embodiment is that the touch panel 400 further includes a second substrate 112 and an adhesive layer 460 wherein the second substrate 112 may have an inner surface 112A and an outer surface 112B. The second substrate 112 is disposed opposite to the first substrate 111, while the transparent conductive pattern 150 and the low light-shielding decoration layer 120 are disposed between the first substrate 111 and the second substrate 112. Specifically, the low light-shielding decoration layer 120 can be disposed on the inner surface 111A or the inner surface 112A. The adhesive layer 460 is disposed between the first substrate 111 and the second substrate 112 so as to adhere the first substrate 111 to the second substrate 112. The second substrate 112 may include a rigid substrate, such as a glass substrate, a cover lens, and a protection glass, a flexible substrate/thin-film substrate, such as a plastic substrate or other composite substrate thereof. The inner surface 112A of the second substrate 112 faces the inner surface 111A of the first substrate 111. In this configuration, the outer surface 112B of the second substrate 112 can be defined as a touch surface. It should be noted that the second substrate and the adhesive layer may be also integrated into the touch panels respectively disclosed in the second preferred embodiment and the third preferred embodiment, if required, but not limited thereto.

To summarize, the touch panel disclosed in the present invention uses single transparent conductive pattern to respectively form transparent touch electrodes and transparent conductive lines in the viewing region and the peripheral region. Each transparent conductive line may be physically connected to and be formed integrally with the corresponding transparent sensitive electrode. Accordingly, the fabrication process may be simplified and the drawbacks, such as worse electrical connection and low reliability that resulting from respectively forming conductive lines and touch electrodes composed of different materials may be overcome by this integral formation process. Furthermore, the transparent conductive lines disposed on the low light-shielding decoration layer cannot be seen so that the appearance of the touch panel with the low light-shielding decoration layer may also be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
  a first substrate, comprising a peripheral region;
  a low light-shielding decoration layer, disposed on the first substrate within the peripheral region; and
  a transparent conductive pattern, comprising:
    a plurality of transparent touch electrodes, at least disposed on the first substrate; and a plurality of transparent conductive lines, disposed on the low light-shielding decoration layer within the peripheral region, wherein each of the transparent conductive lines is connected with at least one of the transparent touch electrodes.

2. The touch panel according to claim 1, wherein each of the transparent conductive lines is formed integrally with at least one of the transparent touch electrodes.

3. The touch panel according to claim 1, wherein the low light-shielding decoration layer comprises color photoresist or ink.

4. The touch panel according to claim 1, wherein the transparent conductive pattern is metal mesh pattern.

5. The touch panel according to claim 1, wherein the first substrate comprises a cover lens or a cover glass.

6. The touch panel according to claim 1, wherein the transparent touch electrodes comprise a plurality of signal transmitting electrodes and a plurality of the signal receiving electrodes, respectively used to transmit and receive touch signal.

7. The touch panel according to claim 1, wherein the transparent conductive electrodes comprise:
   a plurality of first axis electrodes, aligned along a first direction, wherein each of the first axis electrodes is physically separated from one another;
   a plurality of second axis electrodes, aligned along a second direction, wherein two adjacent second axis electrodes along the second direction are physically connected with each other and formed integrally;
   a plurality of bridge electrodes, each bridge electrode contacting two adjacent first axis electrodes; and
   a plurality of isolation blocks, disposed between the bridge electrodes and the second axis electrodes.

8. The touch panel according to claim 1, wherein the first substrate comprises a flexible substrate or a thin film substrate.

9. The touch panel according to claim 1, wherein an optical density of the low light-shielding decoration layer is lower than or equal to 3.

10. The touch panel according to claim 1, wherein the low light-shielding decoration layer comprises single layer or multiple layers stacked with each other.

11. A touch panel, comprising:
   a first substrate, comprising a peripheral region;
   a second substrate, opposite to the first substrate;
   a low light-shielding decoration layer, disposed on the first substrate within the peripheral region; and
   a transparent conductive pattern, comprising:
      a plurality of transparent touch electrodes, disposed on the second substrate; and
      a plurality of transparent conductive lines, disposed on the second substrate corresponding to the peripheral region, wherein each of the transparent conductive lines is connected with at least one of the transparent touch electrodes.

12. The touch panel according to claim 11, wherein the low light-shielding decoration layer comprises color photoresist or ink.

13. The touch panel according to claim 11, wherein the transparent conductive pattern is metal mesh pattern.

14. The touch panel according to claim 11, wherein the first substrate comprises a cover glass.

15. The touch panel according to claim 14, further comprising a second substrate, wherein the second substrate comprises a plastic substrate.

16. The touch panel according to claim 11, wherein an optical density of the low light-shielding decoration layer is lower than or equal to 3.

17. The touch panel according to claim 11, wherein the low light-shielding decoration layer comprises single layer or multiple layers stacked with each other.

* * * * *